(12) United States Patent
Neubert et al.

(10) Patent No.: US 7,638,190 B2
(45) Date of Patent: Dec. 29, 2009

(54) WEB MATERIAL WITH AN ULTRATHIN COATING VARNISH ALLOWING RAPID SUSTAINED SPREADING AND/OR VERY RAPID, SUSTAINED TRANSPORT OF FLUIDS

(75) Inventors: Ingo Neubert, Norderstedt (DE); Maren Klose, Seevetal (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 11/972,918

(22) Filed: Jan. 11, 2008

(65) Prior Publication Data
US 2008/0176068 A1    Jul. 24, 2008

(30) Foreign Application Priority Data
Jan. 19, 2007    (DE) .................. 10 2007 003 755

(51) Int. Cl.
B32B 27/06    (2006.01)
B32B 27/36    (2006.01)
B05D 3/02    (2006.01)
B01F 17/02    (2006.01)

(52) U.S. Cl. .................. 428/341; 428/212; 428/213; 428/215; 428/219; 428/332; 428/334; 428/336; 428/339; 428/340; 428/480; 427/2.1; 427/2.13; 427/2.3; 427/2.31; 427/372.2; 427/384; 427/419.1; 427/419.8; 516/198; 516/200; 516/202; 516/204

(58) Field of Classification Search ............... None
See application file for complete search history.

(56) References Cited

U.S. PATENT DOCUMENTS

| | | | |
|---|---|---|---|
| 4,348,455 A * | 9/1982 | Clayton | 428/336 |
| 5,262,475 A * | 11/1993 | Creasy | 525/58 |
| 5,279,677 A * | 1/1994 | Das | 134/3 |
| 5,304,468 A | 4/1994 | Phillips et al. | |
| 5,759,364 A | 6/1998 | Charlton et al. | |
| 5,873,931 A * | 2/1999 | Scholz et al. | 100/13 |
| 5,916,635 A * | 6/1999 | Ishii et al. | 427/388.2 |
| 5,997,817 A | 12/1999 | Crismore et al. | |
| 6,156,409 A * | 12/2000 | Doushita et al. | 428/143 |
| 6,555,061 B1 | 4/2003 | Leong et al. | |
| 6,946,498 B2 * | 9/2005 | Kayanoki | 522/99 |

(Continued)

FOREIGN PATENT DOCUMENTS

DE    1 177 851    9/1964

(Continued)

OTHER PUBLICATIONS

F. Garbassi et al; "Polymer Surfaces, From Physics to Technology"; John Wiley & Sons(1998) Chapter 6, p. 235 and Chapter 7, p. 256.

(Continued)

*Primary Examiner*—Vivian Chen
(74) *Attorney, Agent, or Firm*—Norris McLaughlin & Marcus, P.A.

(57)    ABSTRACT

Material in web form intended in particular for use in a diagnostic strip and composed of a carrier material coated on one or both sides with an ultrathin coating varnish comprising at least one anionic surfactant based on a sulphosuccinic ester salt, the ultrathin coating varnish having, after drying, a coating distribution of from 5 to 100 mg/m$^2$.

16 Claims, 2 Drawing Sheets

U.S. PATENT DOCUMENTS

| | | |
|---|---|---|
| 7,378,451 B2 * | 5/2008 | Levitt et al. .................. 516/198 |
| 7,384,684 B2 * | 6/2008 | Konrad et al. ................ 428/215 |
| 2002/0102739 A1 | 8/2002 | Nomura et al. |
| 2002/0110486 A1 | 8/2002 | Shartle et al. |
| 2005/0084681 A1 | 4/2005 | Levitt et al. |
| 2008/0014658 A1 * | 1/2008 | Neubert et al. .............. 436/514 |

FOREIGN PATENT DOCUMENTS

| | | |
|---|---|---|
| DE | 1 546 307 | 11/1970 |
| DE | 25 48 279 A1 | 8/1976 |
| DE | 30 21 166 A1 | 12/1980 |
| DE | 198 15 684 A1 | 10/1999 |
| DE | 19829165 A1 | 1/2000 |
| DE | 198 49 008 A1 | 4/2000 |
| DE | 10 2004 013 699 | 10/2005 |
| DE | 102 34 564 A1 | 1/2008 |
| EP | 0 451 981 A2 | 10/1991 |
| EP | 0 545 439 A1 | 6/1993 |
| EP | 1 225 448 A2 | 7/2002 |
| EP | 1 358 896 A1 | 11/2003 |
| EP | 1 394 535 A1 | 3/2004 |
| EP | 1418211 A | 5/2004 |
| EP | 1 647 568 A1 | 4/2006 |
| EP | 1777251 A | 4/2007 |
| GB | 1 073 596 | 6/1967 |
| WO | 93 03673 A1 | 3/1993 |
| WO | 93 14932 A | 8/1993 |
| WO | 01 67099 A1 | 9/2001 |
| WO | 03 008933 A2 | 1/2003 |
| WO | 03 067252 A2 | 8/2003 |
| WO | 03 082091 A2 | 10/2003 |
| WO | 2005 039770 A1 | 5/2005 |
| WO | 2005 111606 A2 | 11/2005 |
| WO | 2006 000505 A2 | 1/2006 |

OTHER PUBLICATIONS

Ullmann's Encyclopedia of Industrial Chemistry, vol. A 25, 1994, Editors Barbara Elvers et al; p. 747.

Cohne, "Modern Coating and Drying Techn."; Wiley-VCH, 1992, Chapters 1 and 3.

Cohne, "Modern Coating and Drying Techn."; Wiley-VCH, 1992, Chapters 1 and 3.

* cited by examiner

WEB MATERIAL WITH AN ULTRATHIN COATING VARNISH ALLOWING RAPID SUSTAINED SPREADING AND/OR VERY RAPID, SUSTAINED TRANSPORT OF FLUIDS

The present invention relates to a material in web form that allows rapid, sustained spreading and/or very rapid, sustained transport of biological fluids such as blood, urine, saliva or cell fluid, for example.

In modern medical diagnosis, strips referred to as diagnostic test strips, or biosensors, are being used for an increasingly large number of analytical test strips. These strips or biosensors can be used, for example, to determine the level of glucose, cholesterol, proteins, ketones, phenylalanine or enzymes in biological fluids such as blood, saliva and urine.

The most frequently encountered diagnostic test strips are those used for determining and monitoring the blood sugar level in diabetics. Roughly 175 million people worldwide suffer from diabetes mellitus type 1 and type 2. The trend of this condition is rising.

Patients affected by this incurable disease have to monitor their blood sugar level up to five times a day in order to obtain the best match between the dosage of the medication (insulin) and the consumption of food. In the event of an excessive blood sugar level, as a consequence of non-monitoring, considerable health-related damage is likely, and may even lead to death (diabetic shock as a result of undersupply or even oversupply of sugar). Until a few years ago, diabetics relied on the support of medical staff in order to determine the blood sugar level. To make monitoring blood sugar level as simple as possible a test was developed which enables the diabetic to determine his or her own blood sugar level with a minimum of effort and without reliance on medical staff.

To determine the blood sugar level the tester has to apply a drop of blood to a diagnostic test strip. During this procedure the diagnostic test strip is located in a read device or evaluation device. Following a reaction time or response time, the evaluation device indicates the current blood sugar level. Read or evaluation devices of this kind are described for example in U.S. Pat. No. 5,304,468 A, in EP 1 225 448 A1 and in WO 03/082091 A1.

One of the first patents in the field of test strips appeared back in 1964. GB 1,073,596 A describes a diagnostic test and the test strips for analysing biological body fluids especially for the purpose of determining blood sugar. The diagnostic test functions via the determination of a colour change which is triggered by an enzyme reaction.

Determining a change in the concentration of a dye (photometric method) is still a method used today in the determination of blood sugar using diagnostic test strips. The enzyme glucose oxidase/peroxidase reacts with the blood sugar. The hydrogen peroxide formed then reacts with an indicator, o-tolidene for example, which leads to a colour reaction. This alteration in colour can be monitored by colorimetric methods. The degree of colour change is directly proportional to the concentration of blood sugar. The enzyme in this case is located on a fabric.

This method is described for example in EP 0 451 981 A1 and in WO 93/03673 A1.

BRIEF DESCRIPTION OF THE DRAWINGS

The invention will now be described in greater detail with reference to the drawings, wherein.

Figure 1A:
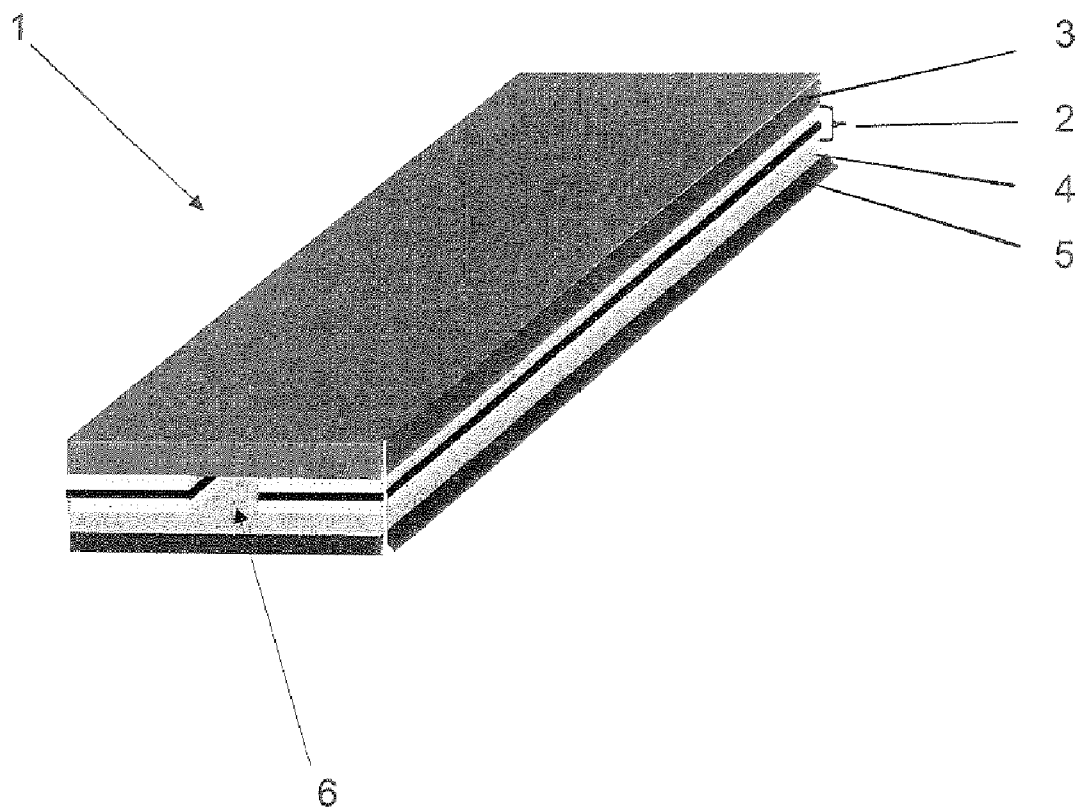
FIGS. 1a and 1b are schematic showing an exemplary construction of a medical diagnostic test strip according to the present invention.

The modern development of diagnostic test strips is aimed at reducing the measurement time between the application of the blood to the test strip and the appearance of the result. The measurement time, or the time between application of the blood to the biosensor and display of the result, is dependent not only the actual time of the enzyme reaction and the ensuing reactions but also, to a considerable extent, on how rapidly the blood is transported within the biosensor from the point at which it is applied to the reaction site, in other words to the enzyme.

One of the ways in which the measuring time is reduced is by the use of hydrophilicized nonwovens or fabrics as in U.S. Pat. No. 6,555,061 B, in order to transport the blood more rapidly to the reaction site (enzyme). The measuring method is identical with that described in EP 0 451 981 A1. Surface-modified fabrics with a wick effect for the biological fluid are described in WO 93/03673 A1, WO 03/067252 A1 and US 2002/0102739 A1. In US 2002/0102739 A1 a blood transport of 1.0 mm/s is achieved through plasma treatment of the fabric. When fabrics are used to transport the biological test fluid, such as blood, for example, it is nevertheless the case that a chromatography effect is observed; in other words, the individual constituents, such as cells, are separated from the liquid constituents. The chromatography effect is explicitly exploited in WO 03/008933 A2 for the separate analysis of the blood constituents.

An onward development from the photometric measurement technique is the electrochemical determination. This method and a corresponding diagnostic test strip are described in WO 01/67099 A1. The diagnostic strip is constructed by the printing of various functional layers, such as electrical conductors, enzyme and hot-melt adhesive, onto the base material, which is made of polyester, for example. Subsequently, by means of thermal activation of the adhesive, a hydrophilic film, not described in any greater detail, is laminated on. The purpose of this hydrophilic film, here again, is to transport the blood to the measuring cell.

With this construction there is no need for fabric or nonwoven to transport the blood. The advantage of this construction and also of the new measurement technique is that the blood sugar level can be measured with a very much smaller volume of blood, of around 0.5 to 3 μl, and in a shorter measuring time of 3 to 5 seconds.

In principle the wettability can be improved and hence the rate of transport of the biological fluid within the diagnostic strip increased, with an accompanying reduction in the measuring time, by means of coatings with polar polymers such as, for example, polyvinylpyrrolidone, polycaprolactam, polyethylene glycol or polyvinyl alcohol. The wettability or hydrophilicity of these coatings, however, is too low for the rapid transport of biological fluids and hence unsuitable for the desired application.

Another possibility lies in the chemical or physical modification of the surfaces. Standard techniques for achieving this include corona treatment and flame treatment. Such treatments, however, are not stable over time. The marked increase in surface energy that is achieved as a result of the surface treatment falls back to the original level after just a few days.

Etching the surface with a strong acid likewise increases the hydrophilicity. Industrial films have their surfaces etched using, for example, oxidizing acids such as chromosulphuric acid or potassium permanganate in conjunction with sulphuric acid. Polyester films (PET) are typically hydrolysed in the industry by chemical treatment with, for example, trichloroacetic acid or potassium hydroxide on their surface, as disclosed in WO 2005/111606 A1. With these techniques the wettability and surface tension are stable even after storage. However, the wetting properties are not homogeneous over the treated area. Further information on the surface treatment of films is found in "Polymer Surface", F. Garbassi et al., John Wiley Verlag 1998 (ISBN 0471971006), Chapter 6 (page 235) and Chapter 7 (page 256).

Within the literature there are descriptions of the use of surfactants, known to the skilled person as interface-active substances, for the purpose of improving the wettability. Surfactants are molecules or polymers which are composed of an apolar/hydrophobic moiety (tail) and of a polar/hydrophilic group (head). To improve the wettability of surfaces the surfactants are added to the aqueous fluid. The surfactant brings about a reduction in the surface tension of the aqueous fluid at the interfaces (liquid/solid and liquid/gaseous). This effect of improving the wettability of the surfaces is measurable as a reduction in the contact angle. The skilled person makes a distinction between anionic, cationic, amphoteric and nonionic surfactants. The hydrophobic tail of surfactants may be composed of linear or branched alkyl, alkylbenzyl, perfluorinated alkyl or siloxane groups. Possible hydrophilic head groups are anionic salts of carboxylic acids, phosphoric acids, phosphonic acids, sulphates and sulphonic acids, cationic ammonium salts or nonionic polyglycosides, polyamines, polyglycol esters, polyglycol ethers, polyglycol amines, polyfunctional alcohols or alcohol ethoxylates (Ullmann's Encyclopaedia of Industrial Chemistry, Vol. A25, 1994, p. 747).

DE 102 34 564 A1 describes a biosensor which is composed of a planar sensor or test strip and of a compartmented reaction and measurement chamber attachment produced by embossing a PVC film. The sample reception channel and the measurement chamber are furnished with a hydrophilic fabric or a surfactant for the transport of the biological fluid. A very similar electrochemical sensor is described in U.S. Pat. No. 5,759,364 A1. The sensor is composed of a printed base plate and of an embossed outer film of PET or polycarbonate. In this case the measuring chamber is coated with a polyurethane ionomer for accelerated fluid transport.

A number of publications mention the use of hydrophilic materials such as fabrics (DE 30 21 166 A1), membranes (DE 198 49 008 A1) and films (EP 1 358 896 A1, WO 01/67099 A1), albeit without giving further details of the hydrophilic coatings.

DE 198 15 684 A1 describes an analytical aid composed of a zone of active capillarity, an adhesive tape diecut, and a cover film of active capillarity. The cover film of active capillarity possesses hydrophilic surface properties which are achieved by vapour-coating it with aluminium and by subsequent oxidation.

US 2005/0084681 A1 discloses a surface having a hydrophilic coating. This coating is composed of a surfactant, preferably a nonionic alcohol ethoxylate, and a stabilizer, preferably an alkylbenzyl sulphonate. The ratio of surfactant to stabilizer in the dried coating is one to three parts of surfactant to 0.25 to 2.5 parts of stabilizer. The stabilizer, which is preferably an anionic surfactant, ensures long-term stability for the hydrophilic coating. The stabilizing effect is brought about by the stabilizer having a melting temperature >25° C., preferably >45° C., as a result of which the vapour pressure is reduced (evaporation of the surfactant combination is reduced) and hence the long-term stability of the hydrophilic coating is attained.

In the application, in a diagnostic strip, nevertheless, it is observed that the coating fails after just a very short storage time at slightly elevated temperatures, and the biological test fluid is no longer transported into the measurement channel.

EP 1 647 568 A1 describes what is called an anti-fog coating. This coating is applied to a polyester film and it serves to prevent the formation of water droplets in food packaging. The anti-fog coating is a hydrophilic coating comprising an anionic surfactant, a polyvinylpyrrolidone as matrix polymer, and water.

Nowadays there are already hydrophilic films available commercially for use in medical diagnostic strips, examples being the products 9962 and 9971 from 3M Inc., whose use is shown in US 2002/0110486 A1 and EP 1 394 535 A1. These products feature are a polyester film which is provided on either one side or both sides with a hydrophilic coating. This coating consists of a polyvinylidene chloride coating comprising a surfactant based on an alkylbenzylsulphonate. The surfactant is required first to migrate to the surface of the coating before the hydrophilic surface properties can be developed. A detailed analysis shows that these products, while suitable for the transport of biological fluids in diagnostic test strips, exhibit significant deficiencies in respect of homogeneity, transport rate and ageing stability.

Further commercially available hydrophilic films include the products ARflow® 90128 and ARflow® 90469 from Adhesives Research Inc., whose use is shown in U.S. Pat. No. 5,997,817 A1. These products consist of polyester film which are coated with a thermoplastic copolyester, with the addition of a surfactant. The mode of action is analogous to that of the above-described 3M Inc. products. In order to avoid inhomogeneities, considerably larger amounts are added here, about 5% to 8% of the surfactant. The consequence of this, however, is that the surface to the hydrophilic coating is waxlike. Sufficient bond strength with pressure-sensitive adhesive tapes on this coating (see layer 2 in FIG. 1) is not to be achieved. In the production operation for the test strips, this leads frequently to the delamination of the assembly.

The diagnostic test strips described are produced in the majority of cases by means of a discontinuous sequence of coating steps and laminating steps. The base materials used are sheets of a 200 to 500 μm thick film of polyvinyl chloride, polyester or polycarbonate measuring about 400×400 mm.

The coating and laminating steps are commonly followed by a series of slitting operations. In view of the small size of the diagnostic strips, of around 20 mm×5 mm, a very high degree of precision is necessary in the coating, laminating and slitting operations. Slitting to form the diagnostic strips is typically accomplished at very high cycle rates using slitting machines which come from, for example, Siebler GmbH or Kinematik Inc. In the course of the slitting operations it is possible for problems to occur to a considerable extent. If unsuitable materials are used which exhibit inadequate adhesion to one another in the course of lamination, a delamination of the layers in the slitting operation is a frequently observed phenomenon. The source of this inadequate adhesion may lie in an unsuitable adhesive, in other words one with inadequate bond strength, or in an unsuitable bonding substrate, and/or in an unsuitable coating of the bonding substrate, as in the case of ARflow® 90128 and ARflow® 90469 from Adhesives Research Inc.

It is an object of the present invention to provide a material in web form which has an ultrathin coating varnish and which in accordance with the requirements for use in diagnostic test strips is suitable for their construction, and which in particular ensures rapid transport of the biological fluid within the measurement channel even after relatively long storage under various conditions and also a high assembly strength with pressure-sensitive adhesive tapes featuring high-shear-strength adhesives applied at a low rate. In this context it is further necessary to ensure that the properties, and especially the wetting properties and transport properties, of the web material are retained even after a long period of storage.

This object is achieved by means of a web material as specified in the main claim. The dependent claims provide advantageous developments of the subject matter of the invention. The invention further encompasses the possibility for use of the film of the invention in applications including in medical diagnostic strips for analysing biological fluids.

The invention accordingly provides a material in web form which is composed of a carrier material having on one or both sides an ultrathin coating varnish comprising at least one anionic surfactant which is based on a sulphosuccinic ester salt. The coating composition after drying is from 5 to 100 mg/m², preferably from 10 to 50 mg/m² and most preferably from 15 to 30 mg/m².

The sulphosuccinic ester salt has the following chemical structure:

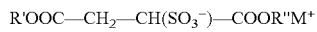

where $M^+$=for example $Na^+$ or $K^+$

R', R''=alkyl chain, for example butyl, hexyl, 2-ethylhexyl.

For the ultrathin coating varnish of the invention it is preferred to use sodium bis-2-ethylhexyl sulphosuccinate (CAS number 577-11-7) such as, for example, Lutensit® A-BO from BASF AG or Rewopol® SB DO 75 from Goldschmidt GmbH. With particular preference the coating varnish is composed exclusively of sodium bis-2-ethylhexyl sulphosuccinate without further additives.

The ultrathin coating varnish of the material according to the invention allows biological fluids, for example, to be transported sustainedly rapidly, so that the material is suitable for medical applications such as diagnostic strips which are used to analyse biological fluids.

The characteristic property of the web material of the invention is its very good sustained wettability for biological fluids such as blood, urine, saliva and cell fluid, leading to very wide and rapid spreading and hence to the transport of the fluids.

This property is reflected in:
a surface tension of at least 65 mN/m, preferably of at least 70 mN/m,
a contact angle with water of less than 30°
an areal spread with 0.5 ml of water of at least 10 cm²

The ultrathin coating varnish is additionally notable for very good compatibility with the detection reaction and enzyme reaction, which is to say that these reactions are unaffected by the coating varnish or its ingredients. The high compatibility is manifested in the fact that the use of the material of the invention in a blood sugar measuring strip, for example, is not accompanied by observation of any change in the result of the measurement of the blood sugar level of the sample.

Furthermore, the ultrathin coating varnish is distinguished by very good ageing stability of the wetting and spreading properties. The ageing stability is tested by means of the spreading surface and in particular by determining the transport rate of an aqueous test fluid in the measurement channel of a test strip. Thus it is observed that the areal spread of 0.5 ml of water on the coating varnish, even after storage at 40° C. for 10 weeks or at 70° C. for 10 weeks is at least 85% and preferably at least 90% of the original value prior to storage. By spreading is meant the propagation of a fluid as a transport process on a solid phase (surface).

The transport rate of an aqueous test fluid (for example, deionized water and 0.1% by weight of methyl blue) in a measurement channel of a blood sugar test strip is determined by means of optical and/or electronic time measurement, with the coating varnish forming one wall of the channel. The transport rate of the test fluids is at least 20 mm/s and preferably at least 30 mm/s even after storage at 40° C. for 10 weeks or at 70° C. for 10 weeks.

The transport rate of blood as the test fluid is preferably at least 7 mm/s.

In the literature there are numerous investigations into the phenomenon of wettability and of the improvement in wettability through the use of surfactants.

Figure 2:
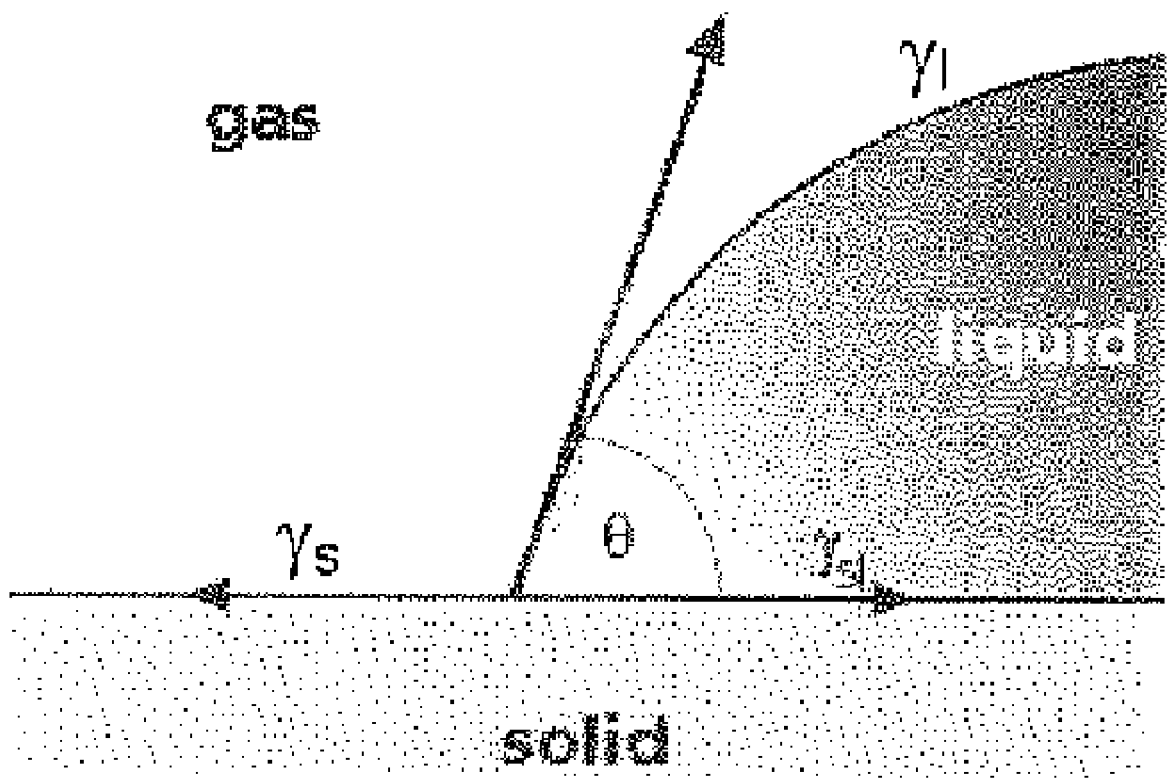
FIG. 2 is a graph depicting the wetting of a solid by a liquid.

The phenomenon of the wetting of a solid by a liquid is described by Young's equation (Eq. 1) (see FIG. 2 in this context)

$$\gamma_l \cos \theta = \gamma_s - \gamma_{sl} \qquad \text{Eq. 1}$$

θ—contact angle (wetting angle)
$\gamma_l$—surface tension of the liquid
$\gamma_s$—surface tension of the solid
$\gamma_{sl}$—interfacial tension between the liquid and the solid If the contact angle θ is >>90°, liquid and solid are highly incompatible, and the surface of the solid is not wetted by the liquid. In the range from 90° to 20° there is a wetting of the solid's surface. At contact angles θ<20°, the surface tensions between liquid and solid are very similar, and there is very effective wetting of the solid's surface by the liquid. At contact angles θ<<20° (θ~0°) the liquid spreads out over the solid's surface (see "Die Tenside", Kosswig/Stache, Carl Hanser Verlag, 1993, ISBN 3-446-16201-1, page 23).

In each of these investigations it is the surfactant that is added to the liquid in order to obtain an improvement in the wetting properties of aqueous solutions for arbitrary substrates. There have to date been virtually no investigations in which the surfactant is applied directly to a surface in order to increase its wettability for arbitrary aqueous fluids. In the few such publications there are (see prior art) the surfactant-containing coating serves for hydrophilic modification of the interface between solid and fluid. The surfactant in this case is added to a polymer matrix, for example polyvinylpyrrolidone or polyvinylidene chloride.

Surprisingly, and unforeseeably for the skilled worker, coating varnishes with at least one anionic surfactant based on a sulphosuccinic ester salt, with an ultrathin coating application, after drying thereof, of 5 to 100 mg/m² and preferably 10 to 50 g/m², exhibit very good and also sustained results in respect of wetting ability and fluid transport.

Nonionic surfactants possess considerable mobility on the surface. This leads to the transfer of the surfactant to—for example—deflecting rolls in the processing operation; to transfer, when the coated web is wound up, to its own reverse face; and to migration events in the end product. The hydrophilic coating suffers a reduction, or even a loss, of its functional capacity.

WO 2005/039770 A1 attempts to counter this effect by using a stabilizer. The present invention, however, shows, surprisingly, that the coating varnish of an anionic surfactant based on a sulphosuccinic ester salt with coating application exhibits wetting properties in application that have substantially greater stability to ageing and/or long-term stability, despite the fact that Counterexample G of patent WO 2005/039770 A1 denies this possibility. Critical to the functional capacity of the coating varnish of the invention is the ultrathin coating application in combination with the anionic surfactant based on sulphosuccinic ester salt.

One typical application of the material of the invention is in medical diagnostic strips. In the diagnostic strips the web material of the invention ensures the transport of the biological fluid, the analyte. This transport must take place reliably and with the same rate even after a relatively long period of time (storage time of the diagnostic strip). Coating varnishes based on nonionic surfactants such as fatty alcohol ethoxylates or silicone alcohol ethoxylates, for example, exhibit a markedly poorer ageing stability in spite of their better wetting properties. These coating varnishes show a distinct decrease in wetting properties after storage for just 3 weeks at 70° C. Even more dramatic is the behaviour of these coating varnishes in application in a diagnostic strip. Here, after just a few days, the wetting properties have reduced so sharply that the diagnostic strip no longer has functional capacity. The transport of test fluid into the measurement channel no longer takes place. This phenomenon is probably a migration phenomenon and/or an incompatibility between the surfactant and the adhesive of the diecut.

For the web material of the invention, with very good wetting properties and spreading properties, suitable coating varnishes are those comprising at least one anionic surfactant based on a sulphosuccinic ester salt, preferably a coating varnish composed exclusively of a sulphosuccinic ester salt.

The ultrathin coating varnish is distinguished by a water contact angle of less than 30°, by a surface tension of at least 65 mN/m, preferably at least 70 mN/m, the areal spread of 0.5 ml of water being at least 10 cm$^2$, by a transport rate for an aqueous test fluid of at least 20 mm/s and preferably at least 30 mm/s, and also by good bond strength for adhesive tapes.

The very good wetting properties alter only slightly or not at all even after storage at 25° C. over a period of two years. To assess the storage stability of the coating varnishes of the invention, accelerated ageing at elevated temperatures is carried out. The wetting properties are assessed primarily using the spreading test (areal spread) and the channel test.

The coating varnish may comprise one or more ageing inhibitors for improving the long-term stability, preferably precisely one ageing inhibitor and/or stabilizer. The use of stabilizers such as ageing inhibitors is known in the plastics industry. For instance, in the production of materials, including materials of construction, comprising PVC or polyolefins, ageing inhibitors are needed in order to protect these plastics from thermal or oxidative damage during the production operation. In this case use is made sometimes of ageing inhibitor packages consisting of primary and secondary ageing inhibitors ("Plastics Additives Handbook", "Antioxidants" section, Carl Hanser Verlag, 5th edition).

Full-area coatings with the typical coating techniques commonly have a coating thickness of <0.3 μm, corresponding approximately to a coating application of <0.3 g/m$^2$. Examples of customary coatings in this field include primer coatings, release varnish coatings and prints with ink.

In the case of the present invention, a correspondingly high coating application cannot be used. In the case of a coating application greater than 100 mg/m$^2$ the surface becomes waxy or soapy, and self-adhesive diecut parts can no longer be reliably bonded to it. This may lead in turn to the delamination of the biosensors and diagnostic strips in the production operation and in application. Furthermore, at such high coating applications, the result of the electrochemical detection reaction is falsified. The anionic surfactant dissolves for the most part in the test fluid. This considerably alters its conductivity. That leads to the measurement signal being influenced.

A reduction in the coating application leads to the risk of a non-uniform, defective coating, which does not ensure functional capacity.

With particular advantage the web material can be produced in particular for use in a diagnostic strip by applying a coating solution comprising a solvent, containing in solution at least one anionic surfactant based on a sulphosuccinic ester salt, the solids content in the coating solution being less than 2% by weight, preferably less than 1% by weight, to a carrier material, and drying the carrier material with the coating solution, so that, after drying, a coating application in the form of an ultrathin coating varnish of 5 to 100 mg/m$^2$ is produced.

With further preference the carrier material is coated on both sides with a coating solution and then dried.

For ultrathin coatings in the nanometre range, very costly and inconvenient methods are known, such as plasma vapour deposition under a high vacuum. These methods allow a selection of the materials to be coated only to a very limited extent.

Surprisingly and unforeseeably for the skilled person, a coating operation starting from a coating solution having a solids content of less than 2% by weight and preferably less than 1% by weight, with a typical coating process and subsequent drying, leads to a uniform coating varnish having a coating application of 5 to 100 mg/m$^2$.

A particular surprise is that, in spite of this ultrathin coating application, the wetting properties and hence the functional capacity of the coating varnish are obtained over the entire area of the coating.

Solvents used for the coating solution are water, alcohols, preferably ethanol or higher-boiling alcohols such as n-butanol or ethoxyethanol, ketones such as butanone, esters such as ethyl acetate, alkanes such as hexane, toluene or mixtures of the aforementioned solvents. For the coating of the coating solution it is possible to use the typical coating processes. Examples that may be mentioned include spray coating, engraved-roll application, Mayer bar coating, multi-roll coating, printing techniques, and condensation coating ("Modern Coating and Drying Techn.", Cohne, 1992, Wiley-VCH, ISBN 0-471-18806-9, Chapters 1 and 3).

The ultrathin coating varnish may be applied on one or both sides to the carrier material, preferably over the whole area.

Used as a basis for the carrier material of the invention are the typical carrier materials familiar to the skilled person, such as films of polyethylene, polypropylene, oriented polypropylene, polyvinyl chloride, polyester and, with particular preference, polyethylene terephthalate (PET). These may be monofilms, coextruded films or laminated films. This enumeration is exemplary and not exhaustive. The surface of the films may have been microstructured by means of suitable techniques such as embossing, etching or laser treatment, for example. The use of laminates, nonwovens, woven fabrics or membranes is likewise possible. For the purpose of improved anchorage of the coating varnish, the carrier materials may have been chemically or physically pretreated by the standard methods, examples of which that may be mentioned include corona treatment or flame treatment. To promote adhesion it is likewise possible to prime the carrier material using, for example, PVC, PVDC or thermoplastic polyester copolymers.

The thickness of the film of the invention is 12 to 350 μm and preferably 50 to 150 μm.

On the basis of the properties outlined, the material of the invention finds application for, among other things, the construction of medical diagnostic strips for analysing biological fluids, also referred to as biosensors. Further applications for the material of the invention are what are called point-of-care devices and microfluidic devices, by which are meant medical instruments, test plates or test strips containing microstructures or microchannels. These microfluidic devices can likewise be used to analyse biological fluids. Examples that may be mentioned include test strips for determining the coagulation behaviour of blood.

Figure 1B:
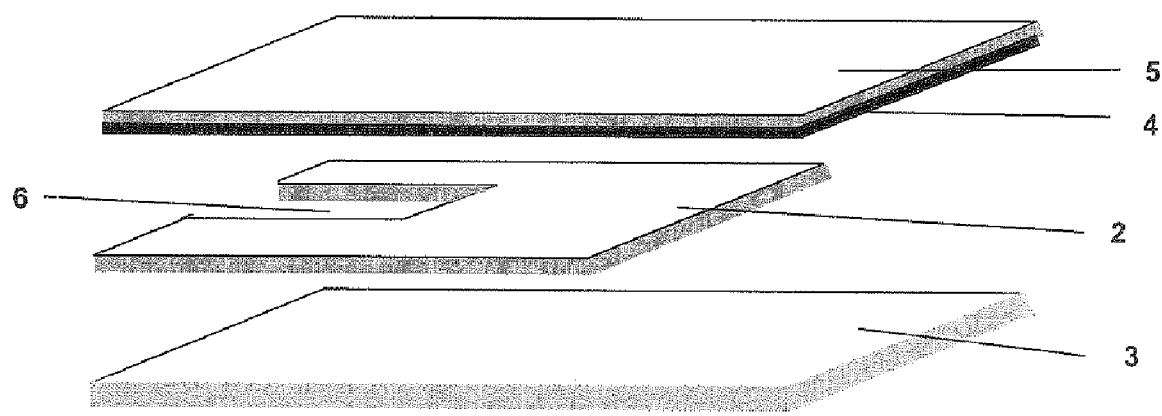

An exemplary construction of a medical diagnostic test strip comprising the material of the invention is depicted diagrammatically in FIGS. 1a and 1b.

Test strip 1 is composed of layers 2, 3, 4 and 5.

Printed onto base material 3 are the electrical conductor tracks and the immobilized enzyme. This printed base layer is for example a diecut of a double-sided pressure-sensitive adhesive tape 2. Tape 2 itself has two layers of, preferably, a pressure-sensitive polyacrylate adhesive between which there is a PET carrier. The diecut of tape 2 forms a measuring channel 6 which is needed to transport the biological fluid to be measured, blood for example, to the measuring cell. Material 5 with the hydrophilic coating varnish 4 is laminated onto tape 2 in such a way that this hydrophilic coating varnish faces towards the inside of the measuring channel and thus forms one of its walls.

Test Methods

Surface Tension and Contact Angle Measurement

The measurement of the contact angle with water and of the surface tension on solid surfaces takes place in accordance with EN 828:1997 using a G2/G402 instrument from Krüss GmbH. The surface tension is determined by the method according to Owens-Wendt-Rabel & Kaeble, by measuring the contact angle with deionized water and diiodomethane. The values are obtained in each case by averaging four results.

Channel Test

The measurement of the transport rate of an aqueous test fluid takes place in a capillary test. For this purpose a surface, printed with conductor tracks, of a 500 μm thick PET film (from Abbott Diagnostic Care Inc.) is laminated with a diecut composed of a double-sided adhesive tape with a thickness of 75 μm (Tesa® 62550, a double-sided pressure-sensitive adhesive tape consisting of a 50 μm PET backing film coated on both sides with an acrylate adhesive, product thickness 75 μm). The diecut forms a measurement channel with a width of 1 mm and is open to both sides. This measurement channel is subsequently covered with the test film, so that the surface under test forms one wall of the channel. The channel or capillary has the following dimensions: height 75 μm and width 1 mm.

A drop of the test fluid, consisting of deionized water and 0.1% by weight of methyl blue, is then held to the opening of the measurement channel, and a measurement is made of the time taken for the fluid front to travel a measurement path of 2.3 mm (distance between the measurement markings). The time is determined either electrically or by means of a video camera. The time measured is used to calculate the flow rate or transport rate.

As the test fluid, use is likewise made of biological fluids such as blood. However, biological fluids such as blood are less suitable as the test fluid, since they are subject to fluctuations in properties. Thus, for example, the viscosity of blood fluctuates very sharply. The viscosity of blood is dependent on the haematocrit value.

Areal Spread and Spread Rate

For the measurement of the areal spread, 0.5 ml of deionized water to which 0.1% by weight of the dye methyl blue has been added is applied uniformly to the surface under test, using a calibrated pipette from Eppendorf. By means of millimetre paper located beneath the test specimen, the diameter of the wetted area is determined after approximately 15 seconds, and is used to calculate the wetting area.

In order to determine the spread rate, this measurement is recorded by video camera and the rate is calculated from the wetting area after 5 seconds.

The measurement is made under standardized climatic conditions of 23° C. and 50% r.h.

Adhesive Strength

To determine the adhesive strength between the test film and a standard pressure-sensitive adhesive tape with a very high-shear-strength pressure-sensitive adhesive, the adhesive tape Tesa® 4872, a double-sided pressure-sensitive adhesive tape consisting of a 12 μm PET carrier film coated on both sides with an acrylate adhesive, product thickness 48 μm, bond strength to steel 4.0 N/25 mm, is laminated onto the surface under test by being rolled on ten times using a 2 kg roller. Immediately thereafter a measurement is made of the force needed to part the assembly comprising the surface under test and the pressure-sensitive adhesive tape. This is done by pulling the assembly apart at an angle of 180° in a tensile testing machine.

Coating Application

To determine the coating application, 50 cm$^2$ of the coated film are washed with 50 ml of a methanol/water mixture (50:50, v:v). The extract is separated by HPLC (instrument: Agilent 1100 series, Agilent Technologies Inc., column: Phenomenex RP; UV detector). The eluent used is a water/methanol mixture. The concentration and hence the coating application are calculated from the integration of the peak area, using a calibration plot.

Storage for Determining the Ageing Stability

For the assessment of the storage stability, A4 specimens are stored in a drying cabinet at 40° C. for 10 weeks or at 70° C. for 10 weeks. In the course of storage it should be ensured that the coated surface is not covered. In addition, blood sugar test strips (see channel test) are likewise stored at 40° C. for 10 weeks or at 70° C. for 10 weeks in the drying cabinet.

The intention of the text below is to illustrate the invention by means of a number of examples, without wishing thereby to restrict the invention unnecessarily.

EXAMPLES

Example 1

The PET film Hostaphan® RN 100 from Mitsubishi Polyesterfilm GmbH, which is 100 μm thick, is corona-pretreated on one side and then coated with a solution consisting of 0.5% by weight of Rewopol® SB DO 75 from Goldschmidt GmbH in ethanol, using an engraved roller, coating taking place in a width of 2000 mm and at a rate of 200 m/min. The coating varnish is dried in a drying tunnel at 120° C.

The coating varnish exhibits very good wetting properties. The speed of the liquid conveyer in the measurement channel also does not decrease after a storage period of 10 weeks at 70° C.

Example 2

The PET film Hostaphan® RN 100 from Mitsubishi Polyesterfilm GmbH, which is 100 μm thick, is corona-pretreated on one side and then coated with a solution consisting of 0.7% by weight of Lutensit® A-BO and 0.05% by weight of Irganox® 1010 from Ciba Inc. in ethanol, using a wire doctor blade, coating taking place in a width of 500 mm and at a rate of 20 m/min. The coating varnish is dried in a drying tunnel at 110° C.

The coating varnish exhibits very good wetting behaviour for water and aqueous biological fluids such as blood. The coating varnish exhibits good wetting behaviour even after a storage time of 10 weeks at up to 70° C.

Overview of the results of the examples:

|  | Unit | Example 1 | Example 2 |
|---|---|---|---|
| Properties of the web material | | | |
| Coating application | mg/m² | 21 | 29 |
| Anchorage test | N/cm | 2.1 | 1.9 |
| Surface tension | mN/m | 67 | 69 |
| Surface tension after 6 weeks at 70° C. | mN/m | 66 | 68 |
| Contact angle | ° | 23 | 25 |
| Contact angle after 10 weeks at 70° C. | ° | 26 | 27 |
| Areal spread of 0.5 ml of water | cm² | 10 | 11 |
| Areal spread of 0.5 ml of water after 10 weeks at 40° C. | cm² | 12 | 13 |
| Areal spread of 0.5 ml of water after 10 weeks at 70° C. | cm² | 11 | 12 |
| Channel test | mm/s | 41 | 40 |
| Channel test after 10 weeks at 70° C. | mm/s | 33 | 38 |

COUNTEREXAMPLES

Counterexample 1

As counterexample 1 the commercial PET film Hostaphan RN 100 from Mitsubishi Polyesterfilm GmbH is used, whose surface has not been modified or coated. With this film a low surface tension is measured. As a result, aqueous fluids do not spread out on this surface. Nor, as a result, are biological fluids transported into the channel in the channel test.

Counterexample 2

As counterexample 2 a coating is produced in the same way as for Example 1. Deviating from this, however, in this case the coating solution used is composed of 5% by weight of Rewopol® SB DO 75 from Goldschmidt GmbH in ethanol.

This coating exhibits very good wetting properties. The surface, however, is very waxy and soapy. The anchorage of adhesive tapes is virtually impossible. This is reflected in the very low anchorage forces. In the channel test, fluid runs between the hydrophilic coating and the adhesive tape. Measurement is therefore not possible. It is impossible to use this film.

Counterexample 3

As counterexample 3 the commercial hydrophilic film ARflow 90128 from Adhesives Research is used. This product consists of a PET film coated on one side with a surfactant-containing hot-melt adhesive. This coating varnish is lined with a protective film.

This hydrophilic film exhibits moderate to good properties with respect to the spreading of biological fluids. After storage a reduction in the wettability of the film is observed. Another disadvantage is the waxlike surface, owing to the high surfactant concentration.

When the film is employed in multi-layer constructions in which pressure-sensitive adhesive tapes are bonded to this hydrophilic film, this results in a low bond strength and, consequently, in delamination of this adhesive bond. After storage at 70° C. for 10 weeks a reduction in the wetting properties is observed.

Counterexample 4

As counterexample 4 the commercial product 9971 from 3M Inc. is used. This PET film possesses a surface-active coating varnish on one side. This coating consists of a surfactant-containing PVDC coating.

This hydrophilic film exhibits moderate spreading properties for biological fluids. In this context the hydrophilic surface properties are very inhomogeneous over the area and also from one batch to another.

Counterexample 5

As counterexample 5 Example 1 from US 2005/0084681 A1 is reproduced. This is done by coating a 100 μm PET film in the laboratory with 0.6% by weight of Dynoll® 604 from Air Products Inc. and 0.2% by weight of Rhodacal® DS10 from Rhodia in an isopropanol/water mixture (70/30) using a wire doctor blade (No. 1), and then drying the coated film at 100° C. for 3 minutes.

This coating varnish exhibits good wetting properties, which are also stable after storage.

Overview of the results of the counterexamples:

|  | Unit | Counter-example 1 | Counter-example 2 | Counter-example 3 | Counter-example 4 | Counter-example 5 |
|---|---|---|---|---|---|---|
| Surface modification | | — | surfactant | TPET + surfactant | PVDC + surfactant | surfactant + stabilizer |
| Properties of the web material | | | | | | |
| Coating application | mg/m² | | 235 | >1000* | >1000* | not known* |
| Anchorage test | N/cm | 4.8 | 0.2 | 1.3 | 5.1 | 3.8 |
| Surface tension | mN/m | 46 | 71 | 63 | 61-63** | 64 |
| Surface tension after 6 weeks at 70° C. | mN/m | — | 70 | 57 | 58-60** | 64 |
| Contact angle | ° | 63 | 8 | 22 | 23-27** | 21 |
| Contact angle | ° | — | 11 | 24 | 26-30** | 18 |

-continued

|  | Unit | Counter-example 1 | Counter-example 2 | Counter-example 3 | Counter-example 4 | Counter-example 5 |
|---|---|---|---|---|---|---|
| after 6 weeks at 70° C. Areal spread of 0.5 ml of water | cm² | 2.5 no spreading | 17 | 9 | ~7* | 10 |
| Areal spread of 0.5 ml of water after 10 weeks at 40° C. | cm² | — | 17 | 9 | ~6* | 11 |
| Areal spread of 0.5 ml of water after 6 weeks at 70° C. | cm² | — | 16 | 7 | ~5* | 9 |
| Channel test | mm/s | liquid does not migrate into capillary | underruns | 29 | 15 | 41 |
| Channel test after 10 weeks at 70° C. | mm/s | liquid does not migrate into capillary | underruns | 8 | 0.6 | liquid does not migrate into capillary |

*Precise measurement is not possible with the method stated
**Properties of the coating varnish are not homogeneous over the area

The invention claimed is:

1. Material in web form comprising a carrier material coated on one or both sides with a coating solution consisting essentially of at least one anionic surfactant based on a sulphosuccinic ester salt, the coating solution forms an ultrathin coating varnish having a dried coating application weight of 5 to 52 mg/m², wherein the sulphosuccinic ester salt has the following chemical structure:

R'OOC—CH₂—CH(SO₃⁻)—COOR"M⁺ 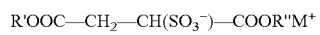

wherein,
M⁺=Na⁺, and
R' and R"=an alkyl chain.

2. Web material according to claim 1, wherein the ultrathin coating varnish possesses the following properties:
a surface tension of at least 65 mN/m
a contact angle with water of less than 30° and/or
an areal spread with 0.5 ml of water of at least 10 cm².

3. Web material according to claim 2, wherein the areal spread is 0.5 ml of water on the ultrathin coating varnish after storage at 40° C. for 10 weeks or at 70° C. for 10 weeks is at least 85% of the original value prior to storage.

4. Web material according to claim 1, wherein the coating solution is applied over the whole area.

5. Web material according to claim 1, wherein the dried coating application of the ultrathin coating varnish is 15-30 mg/m².

6. Web material according to claim 1, wherein the at least one anionic surfactant consists essentially of sodium bis-2-ethylhexyl sulphosuccinate.

7. Web material according to claim 1, wherein the carrier material is composed of a polyester film having a thickness of 12 to 350 μm.

8. Web material according to claim 1, wherein the transport rate of an aqueous test fluid (deionized water and 0.1% by weight of methyl blue) in a channel (75 μm×1 mm) in which the ultrathin coating varnish forms one wall of the channel, is at least 20 mm/s.

9. Web material according to claim 1, wherein the transport rate of an aqueous test fluid (deionized water and 0.1% by weight of methyl blue) in a channel (75 μm×1 mm), in which the ultrathin coating varnish forms one wall of the channel, after storage at 40° C. for 10 weeks or at 70° C. for 6 weeks is at least 20 mm/s.

10. A diagnostic strip, biosensor, point-of-care device or microfluidic device used to analyse biological fluids, wherein said diagnostic strip, biosensor, point-of-care device or microfluidic device comprises web material according to claim 1.

11. Process for producing a web material according to claim 1, comprising applying a coating solution comprising a solvent consisting essentially of in solution at least one anionic surfactant based on a sulphosuccinic ester salt, the solids content in the coating solution being less than 2% by weight, to a carrier material and the carrier material with the coating solution is dried so that, after drying, a coating application in the form of an ultrathin coating varnish of 5 to 52 mg/m² is produced, wherein the sulphosuccinic ester salt has the following chemical structure:

R'OOC—CH₂—CH(SO₃⁻)—COOR"M⁺ 

wherein,
M⁺=Na⁺, and
R' and R"=an alkyl chain.

12. Process according to claim 11, wherein the carrier material is coated on both sides with the coating solution and then dried.

13. Process according to claim 11, wherein the coating of the ultrathin coating varnish takes place with an alcoholic solution that is subsequently dried.

14. Process according to claim 13, wherein the alcoholic solution comprises exclusively the anionic surfactant based on a sulphosuccinic ester salt without further additives.

15. Web material according to claim 1, wherein the alkyl chain is selected from the group consisting of butyl, hexyl and 2-ethylhexyl.

16. Process according to claim 11, wherein the alkyl chain is selected from the group consisting of butyl, hexyl and 2-ethylhexyl.

* * * * *